March 1, 1938.   D. SMITH   2,110,114
AUTOMATICALLY ADJUSTABLE SELF CENTERING DRAWBAR
Filed April 13, 1937

Inventor
Don Smith

By Kimmel & Crowell
Attorneys

Patented Mar. 1, 1938

2,110,114

UNITED STATES PATENT OFFICE 2,110,114

AUTOMATICALLY ADJUSTABLE SELF-CENTERING DRAWBAR

Dan Smith, Liberal, Kans.

Application April 13, 1937, Serial No. 136,683

1 Claim. (Cl. 280—33.44)

This invention relates to an automatically adjustable self-centering drawbar designed primarily for tractors, but it is to be understood that a drawbar, in accordance with this invention is to be employed in any connection for which it may be found applicable, and the invention has for its object to provide, in a manner as hereinafter set forth, a device of the class referred to, so constructed and arranged whereby on forward draft, it centers and is automatically latched in such position, but in making turns it automatically adjusts itself and permits for a square turn and when a complete turn is made it centers for forward draft and automatically latches in such position.

A further object of the invention is to provide, in a manner as hereinafter set forth, a horizontally disposed skeleton hitch element closed at its forward and rear ends and a drawbar having a lost-motion connection with the rear end of the said element and including means intermediate its ends whereby the entire load, on a forward pull or when turning, is had on the rear end of said element.

A further object of the invention is to provide, in a manner as hereinafter set forth, a horizontally disposed skeleton hitch element closed at its forward and rear ends and a drawbar having a lost-motion connection with the forward end of the said element and including means intermediate its ends whereby the entire load, on a forward pull or when turning, is had on the rear end of said element, and with the forward end of the said element having a part coacting with said means for latching the drawbar in centrally of the hitch element in forward draft position.

Further objects of the invention are to provide, in a manner as hereinafter set forth, an automatically adjustable self-centering drawbar which is simple in its construction and arrangement, strong, durable, compact, readily installed with respect to a traction means, thoroughly efficient in its use, and comparatively inexpensive to manufacture.

To the above ends essentially and to others which may hereinafter set forth, the invention consists of the novel construction, combination and arrangement of parts as will be more specifically described and as illustrated in the accompanying drawing wherein embodiment of the invention is shown, but it is to be understood that changes, variations and modifications may be resorted to which fall within the scope of the invention as claimed.

Figure 1:
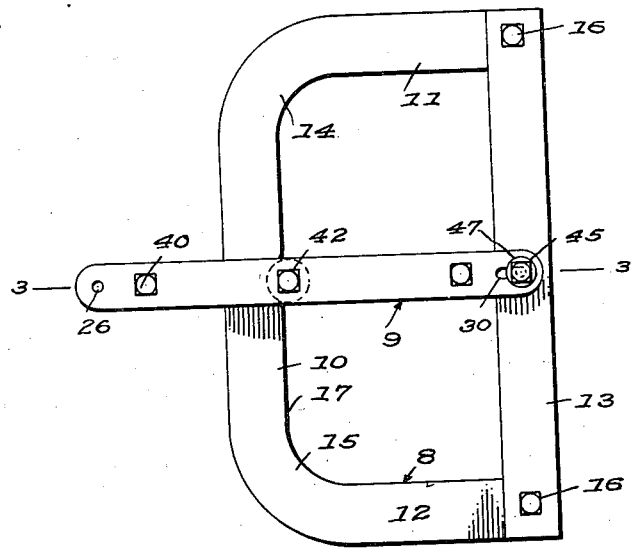
Figure 1 is a top plan view of the hitch.
Figure 2:
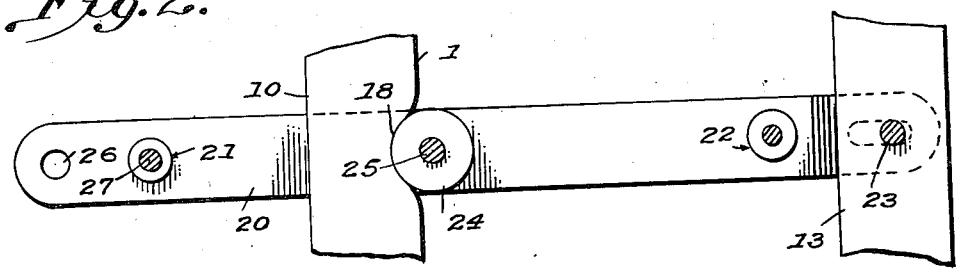
Figure 2 is a sectional plan upon an enlarged scale.
Figure 3:
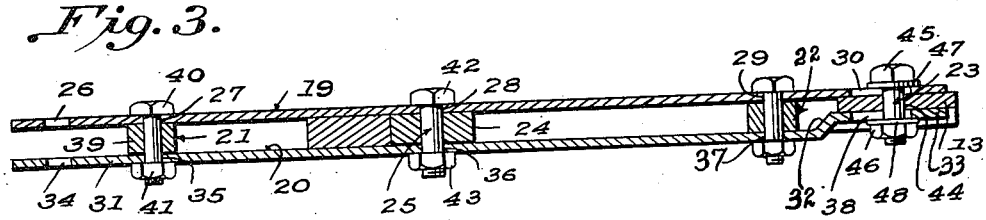
Figure 3 is a section on line 3—3, Figure 1, upon an enlarged scale.

With reference to the structure shown in Figures 1 to 3, it includes a horizontally disposed coupling or carrier element 8 adapted to be secured, as is well known, to the rear end of a traction means, by way of example, a tractor not shown. The element 8 will be hereinafter termed a hitch element which slidably supports the drawbar element 9 of the hitch.

The element 8 is of skeleton form and consists of a rear part 10, a pair of side parts 11, 12 and a forward part 13. The element 8 has a pair of oppositely disposed curved parts 14, 15 forming rounded rear corners which merge into the ends of the rear part 10 and into the rear ends of the side parts 11, 12. Each of the said parts are flat and of rectangular contour in transverse cross section. The forward part 13 is mounted upon and detachably secured to the forward ends of the side parts 11, 12 by the holdfast means 16. The rear part 10 centrally of its forward lengthwise edge 17 is formed with a curved cutout 18 which constitutes a keeper for a purpose to be referred to. The thickness of the forward part 13 is materially less than that of any one of the other parts of the element 8. The latter is substantially of semioval contour in plan. The forward part 13 is of greater length than that of any one of the other of said parts.

The drawbar element 9 consists of an upper section in the form of a bar 19, a lower section in the form of a bar 20, combined spacing and coupling structures 21, 22, a combined pivot forming and coupling structure 23, a revoluble latching member 24 and a shaft forming means 25 for member 24.

The bar 19 is flat and straight throughout and formed inwardly adjacent to its rear end with an opening 26, inwardly adjacent the latter with an opening 27, forwardly of the latter with an opening 28, forwardly adjacent the latter with an opening 29, and in proximity to its forward end with a slot disposed lengthwise thereof. The bar 19 is positioned above and the bar 20 below element 8. The bars 19, 20 are extended rearwardly from the element 8.

The bar 20 is formed of rear, intermediate and forward stretches 31, 32, 33 respectively. The stretch 31 is of materially greater length than the other of said stretches. The stretch 33 is of greater length than stretch 32. The latter extends forwardly at an upward inclination from the forward end of stretch 31 to the rear end of stretch 33 whereby the stretches 31, 33 are disposed in parallel planes. The stretch 31 is formed with openings 34, 35, 36 and 37 which align respectively with the openings 26, 27, 28 and 29 of the bar 19. The stretch 33 is formed with a slot 38 lengthwise thereof which aligns with the slot 30 in the bar 19. The aligned openings 26, 34 are provided for the passage of a means not shown for connection to the machine which is pulled by the tractor.

The aligned openings 27, 35 provide for the positioning of the combined spacing and coupling structure 21 for and relative to the bars 19, 20. The structure 21 includes a spacing collar 39 interposed between the bars 19, 20, a headed bolt 40 extending through the openings 27, 35 and collar 39 and a nut 41 on the lower end of bolt 40. The aligned openings 29, 37 provide for the positioning of the combined spacing and coupling structure 22 for and relative to the bars 19, 20. The structure 22 is of the same form as the structure 21 and is arranged relative to openings 29, 37 in the same manner as the structure 21 is arranged with respect to the openings 27, 35. The latching member 24 is in the form of a roller and it is arranged between the bars 19, 20 at a point for riding against the forward lengthwise edge of the part 10 when element 8 is bodily shifted in either direction. The openings 28, 36 provide for the positioning of the shaft-forming means 25 relative to the member 24. The forward part 13 of element 8 is formed with an opening 44 which aligns with the slots 30, 38. The opening 44, slots 30, 38 provide for the positioning of the combined pivot forming and coupling structure 23 for and relative to the element 8 and bars 19, 20. The structure 23 includes a headed threaded pivot bolt 45 extending through slots 30, 38 and opening 44, a nut 46 on the lower end of bolt 45, a washer 47 on the bolt and interposed between the bar 19 and bolt head and a washer 48 between nut 46 and bar 20. The structure 23 in connection with slots 30, 38 and opening 44 in forward part 13 provide for slidably connecting the draw-bar element 9 to the coupling or carrier element 8, or in other words, a lost-motion connection between the drawbar and part 13 of element 8. The keeper provided by the curved cutout associates with the member 25 to provide for latching the element 9 centrally with respect to the element 8 on forward draft. As the element 9 is slidably connected to the forward of element 8, the said element 9 on forward draft will be shifted forwardly to provide for the coaction of the keeper and member 24 to latch element 9. When the tractor moves from turning to forward draft position the member 24 automatically engages in the keeper and the load is on the rear part 10 of element 8.

Figure 4:
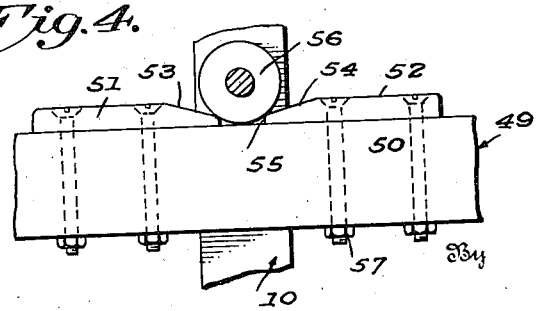
Figure 4 is a fragmentary view in sectional plan of a modified form.

With reference to Figure 4 it discloses a modified form solely relating to a change in the coupling or carrier element indicated at 49 and in this connection the front part 50 of element 49 does not have the central portion of its forward lengthwise edge formed with a curved cutout to provide a keeper, but in lieu thereof the keeper is provided by a pair of oppositely disposed inner endwise aligned spaced short strips 51, 52 having the inner portions of their rear edges beveled as at 53, 54. The space 55 between the inner ends of the strips provide the keeper for the latching member 56. The beveled portions of the strips provide means for deflecting the member 56 into the space 55. When element 49 is bodily shifted in a direction by the tractor, the member 56 moves off of one of the strips. These latter are anchored to rear part 50 of element 49 by headed holdfast devices 57. The heads of such devices are countersunk in the forward edges of the strips. Otherwise than that as stated the form shown by Figure 4 will be the same as that shown by Figures 1, 2 and 3.

What I claim is:

An automatically adjustable self-centering drawbar for use with a skeleton hitch element, said element having a forward and a rear part, the rear part being provided with keeper means disposed centrally thereof, said drawbar including a pair of superposed sections arranged one above and the other below said hitch element, said sections being connected to said forward part by a lost-motion connection, and being provided with a hitch device at their opposite ends, spacing and bracing means arranged between and connecting said sections together, a revolvable latching member carried by said sections and coacting with said keeper to automatically center said drawbar with respect to said element and coacting with said rear part and lost-motion connection to throw the load entirely on said rear part when said drawbar is disposed at various angles with respect to said element.

DAN SMITH.